United States Patent
Codilian et al.

(10) Patent No.: US 6,972,539 B1
(45) Date of Patent: Dec. 6, 2005

(54) DISK DRIVE EMPLOYING COMMUTATION PHASE MODULATION AND CURRENT MODULATION OF A SPINDLE MOTOR

(75) Inventors: Raffi Codilian, Irvine, CA (US); Timothy A. Ferris, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 68 days.

(21) Appl. No.: 10/427,521

(22) Filed: Apr. 30, 2003

(51) Int. Cl.[7] .............................................. G05B 11/01
(52) U.S. Cl. ...................... 318/560; 318/599; 318/811; 318/432; 318/434; 388/911
(58) Field of Search ................................ 318/560, 599, 318/811, 629, 632, 684, 432, 433, 434; 388/911

(56) References Cited

U.S. PATENT DOCUMENTS

| | | |
|---|---|---|
| 3,449,741 A | 6/1969 | Egerton, Jr. |
| 4,063,236 A | 12/1977 | Amemiya et al. .......... 340/347 |
| 4,375,636 A | 3/1983 | Stack et al. ................. 340/347 |
| 4,847,743 A | 7/1989 | Kamiyama .................... 363/41 |
| 5,172,115 A | 12/1992 | Kerth et al. ................. 341/118 |
| 5,223,771 A | 6/1993 | Chari ......................... 318/254 |
| 5,229,772 A | 7/1993 | Hanlon ....................... 341/172 |
| 5,444,582 A | 8/1995 | Suzuki ..................... 360/78.09 |
| 5,444,583 A | 8/1995 | Ehrlich et al. ........... 360/78.09 |
| 5,446,371 A | 8/1995 | Eccleston et al. ....... 324/121 R |
| 5,471,353 A | 11/1995 | Codilian et al. .......... 360/73.03 |
| 5,616,993 A | 4/1997 | Lu et al. ...................... 318/254 |
| 5,625,511 A | 4/1997 | Brooks et al. .............. 508/289 |
| 5,724,328 A * | 3/1998 | Yanagi ..................... 369/47.52 |
| 5,760,563 A * | 6/1998 | Bennett et al. ............. 318/641 |
| 5,808,440 A * | 9/1998 | Bennett et al. ............. 318/778 |
| 5,886,489 A | 3/1999 | Rowan et al. |
| 5,986,426 A | 11/1999 | Rowan |
| 6,016,043 A | 1/2000 | Motzko et al. |
| 6,081,091 A * | 6/2000 | Mitchell et al. ............ 318/685 |
| 6,104,153 A | 8/2000 | Codilian et al. ............ 318/362 |
| 6,160,368 A | 12/2000 | Plutowski ................... 318/375 |
| 6,178,060 B1 | 1/2001 | Liu ......................... 360/78.07 |
| 6,215,266 B1 | 4/2001 | Goh et al. .................. 318/439 |
| 6,236,174 B1 | 5/2001 | White ........................ 318/254 |
| 6,252,362 B1 | 6/2001 | White et al. ................ 318/254 |
| 6,288,866 B1 | 9/2001 | Rutler et al. ............. 360/97.01 |
| 6,304,200 B1 * | 10/2001 | Masuda ..................... 341/144 |
| 6,323,610 B1 | 11/2001 | Ng et al. .................... 318/254 |
| 6,493,169 B1 | 12/2002 | Ferris et al. |
| 6,762,901 B2 * | 7/2004 | Hill ......................... 360/78.04 |

* cited by examiner

*Primary Examiner*—Rina Duda
(74) *Attorney, Agent, or Firm*—Howard H. Sheerin, Esq.

(57) ABSTRACT

A disk drive is disclosed comprising a spindle motor comprising a plurality of windings for rotating a disk. The spindle motor is rotated by commutating the windings over a plurality of commutation states, wherein audible noise generated by the disk drive is reduced by phase modulating the commutation interval. Further audible noise reduction is achieved by modulating a current applied to the windings which substantially reduces discontinuities in the torque output of the spindle motor caused by phase modulation of the commutation intervals.

12 Claims, 9 Drawing Sheets

DISK DRIVE EMPLOYING COMMUTATION PHASE MODULATION AND CURRENT MODULATION OF A SPINDLE MOTOR

CROSS REFERENCE TO RELATED APPLICATIONS AND PATENTS

This application is related to U.S. Pat. No. 6,493,169 entitled "DISK DRIVE EMPLOYING SPINDLE MOTOR COMMUTATION TIME VARIATION FOR REDUCING ACOUSTIC NOISE", and U.S. Pat. No. 5,808,440 entitled "HYBRID COMMUTATION METHOD AND APPARATUS FOR A THREE-PHASE BRUSHLESS DC MOTOR", the disclosures of which are incorporated herein by reference.

BACKGROUND OF THE INVENTION

1. Field of the Invention

The present invention relates to disk drives. More particularly, the present invention relates to a disk drive employing commutation phase modulation and current modulation of a spindle motor.

2. Description of the Prior Art

Disk drives typically employ a multiple phase (e.g., a three phase) spindle motor for rotating one or more disks. The spindle motor comprises a stator having a number of windings and a rotor. The windings are energized with current over a plurality of commutation states to generate a rotating magnetic field. The rotating magnetic field interacts with permanent magnets of the rotor which rotates the spindle motor at a desired angular velocity. A commutation sequencer controls switches to energize the appropriate windings with current relative to the commutation state, and a commutation clock drives the commutation sequencer. The commutation clock is typically generated using a phase locked loop in response to zero-crossings in a back electromotive force (BEMF) voltage generated by the floating (unenergized) windings.

The amount of torque generated by the spindle motor is determined by the angular position of the rotor with respect to the stator, the magnitude of the current driving the windings, and a torque constant Kt. The torque constant Kt is a function of the number of turns in the windings as well as the strength of the permanent magnets. FIG. 1A illustrates the torque curves for a three-phase spindle motor, where the three dashed-line sine waves KtA, KtB, and KtC correspond to the torque profile for each phase of the spindle motor. The commutation clock is shown above the torque curves wherein the commutation state transitions at a substantially fixed commutation interval Tc resulting in the torque output curve shown as a solid black line. The substantially fixed commutation interval Tc results in a frequency spectrum having a fundamental component (the commutation frequency) and harmonics which can excite mechanical resonances and generate undesirable vibrations, such as vibrations that cause undesirable audible noise.

FIG. 1B illustrates a prior art technique of phase modulating the commutation interval (e.g., dithering the commutation interval) in order to spread the commutation energy over the frequency spectrum in the vicinity of the fundamental frequency and its harmonics, thereby reducing the undesirable audible noise (see the above referenced U.S. Pat. No. 6,493,169 assigned to the same entity). However, phase modulating the commutation interval as in FIG. 1B results in discontinuities in the torque output curve at the commutation state transitions which can also generate undesirable audible noise.

There is, therefore, a need to reduce the torque discontinuities in the torque output of a spindle motor caused by phase modulating the commutation interval to reduce the audible noise of a disk drive.

SUMMARY OF THE INVENTION

The present invention may be regarded as a disk drive comprising a disk, a head actuated over the disk, and a spindle motor for generating a torque output to rotate the disk, the spindle motor comprising a plurality of windings. The disk drive further comprises a power driver comprising a plurality of commutation switches for selectively energizing the windings, and a commutation sequencer for controlling the commutation switches to configure the windings into a plurality of commutation states over a plurality of commutation intervals. A phase modulator phase modulates the commutation intervals, and a current modulator controls a current applied to the windings in each of the commutation states to substantially reduce discontinuities in the torque output of the spindle motor caused by the phase modulator.

In one embodiment, the phase modulator and the current modulator reduce internal vibrations, such as internal vibrations that cause undesirable audible noise.

In another embodiment, the current modulator modulates the torque output over the commutation intervals to reduce the discontinuities in the torque output of the spindle motor.

In yet another embodiment, the disk drive further comprises a commutation clock generator for generating a nominal commutation clock. The phase modulator modulates a phase of the nominal commutation clock to generate a phase modulated commutation clock, and the commutation sequencer uses the phase modulated commutation clock to change the commutation state. Phase modulating the commutation clock spreads commutation energy over a frequency spectrum to reduce audible noise generated by the spindle motor, but it also generates torque discontinuities when the commutation sequencer changes the commutation state. The current modulator reduces these torque discontinuities caused by phase modulating the commutation clock.

In yet another embodiment, the current modulator generates a pulse width modulated (PWM) signal, wherein a duty cycle of the PWM signal is adjusted in response to a current command comprising a speed correction current command and a current modulation value corresponding to the commutation interval.

The present invention may also be regarded as a method of operating a disk drive, the disk drive comprising a disk, a head actuated over the disk, and a spindle motor for generating a torque output to rotate the disk, the spindle motor comprising a plurality of windings. The windings are selectively energized based on a plurality of commutation states over a plurality of commutation intervals. The commutation intervals are phase modulated, and a current applied to the windings is modulated in each of the commutation states to substantially reduce discontinuities in the torque output of the spindle motor caused by modulating the phase of the commutation intervals.

DESCRIPTION OF THE PREFERRED EMBODIMENTS

Figure 2:
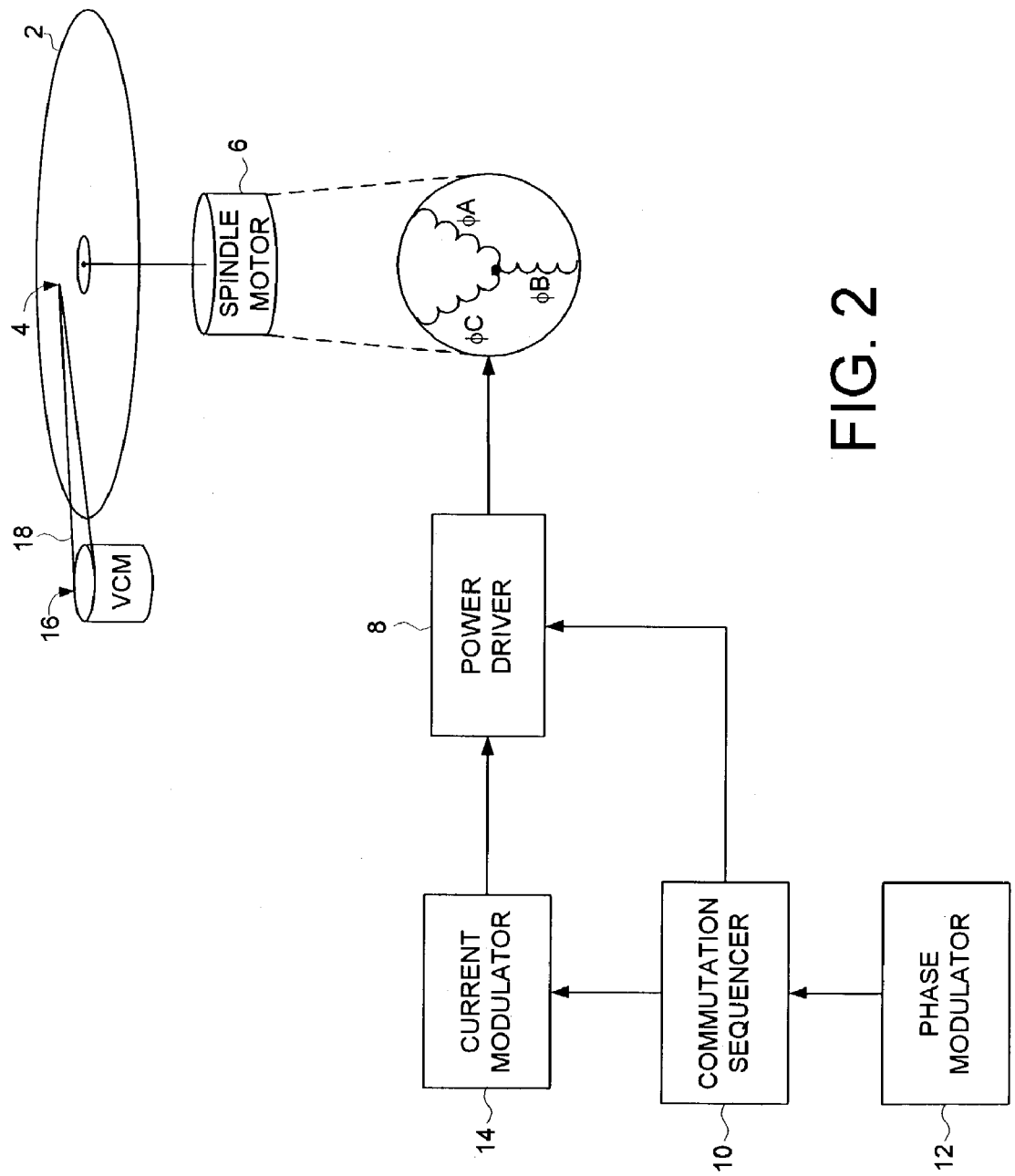
FIG. 2 shows a disk drive according to an embodiment of the present invention comprising a current modulator for controlling a power driver to modulate a current applied to the windings of the spindle motor in order to reduce the discontinuities in the torque output caused by phase modulating the commutation interval.

FIG. 2 shows a disk drive according to an embodiment of the present invention comprising a disk 2, a head 4 actuated over the disk 2, and a spindle motor 6 for generating a torque output to rotate the disk 2, the spindle motor 6 comprising a plurality of windings (φA, φB, φC). The disk drive further comprises a power driver 8 comprising a plurality of commutation switches for selectively energizing the windings (φA, φB, φC), and a commutation sequencer 10 for controlling the commutation switches to configure the windings (φA, φB, φC) into a plurality of commutation states over a plurality of commutation intervals. A phase modulator 12 phase modulates the commutation intervals, and a current modulator 14 controls a current applied to the windings (φA, φB, φC) in each of the commutation states to substantially reduce discontinuities in the torque output of the spindle motor 6 caused by the phase modulator 12.

The spindle motor 6 shown in the embodiment of FIG. 2 comprises three windings connected at a center tap forming three phases (φA, φB, φC); however, any suitable spindle motor comprising any suitable number of windings in any suitable configuration implementing any suitable number of phases may be employed. The disk drive of FIG. 2 further comprises a voice coil motor (VCM) 16 for rotating an actuator arm 18 about a pivot in order to actuate the head 4 radially over the disk 2.

Figure 1A:
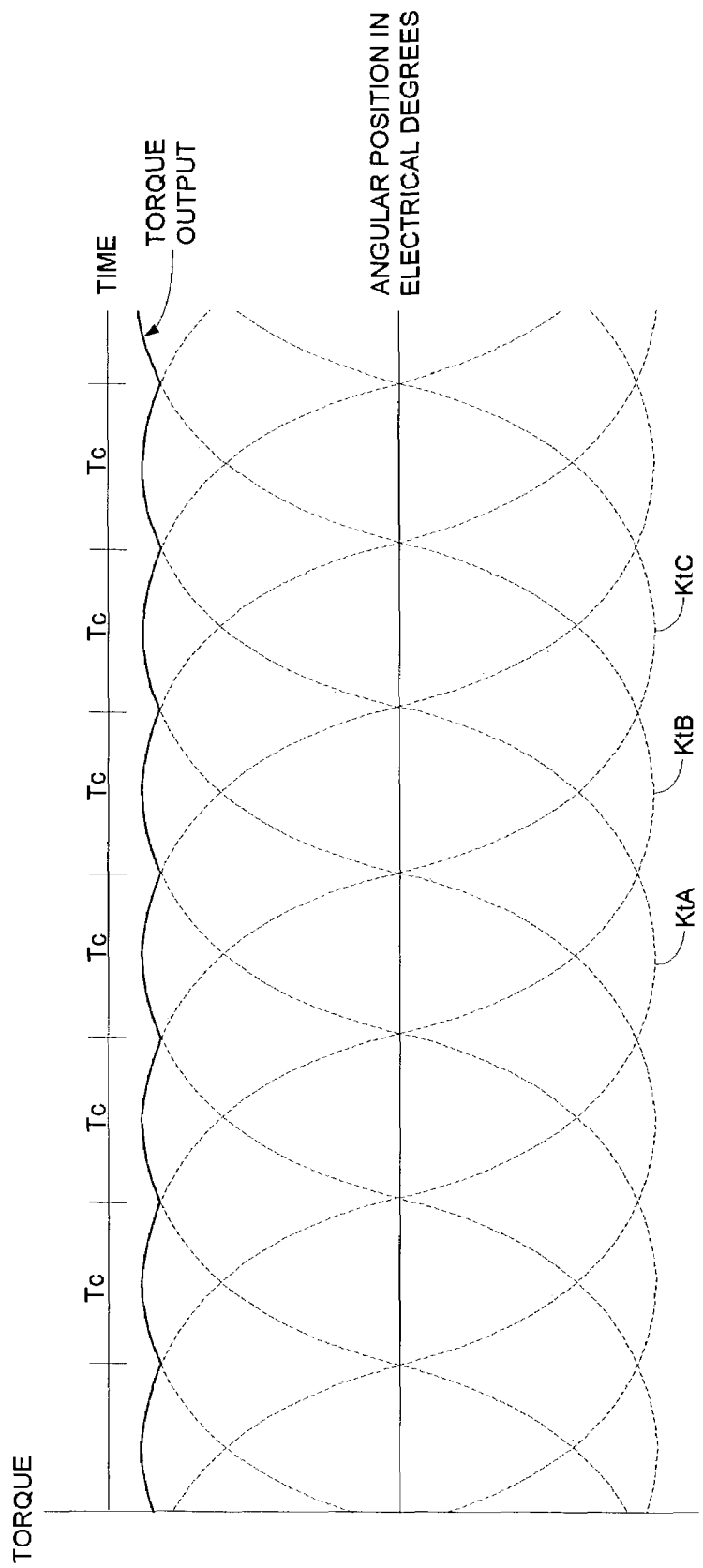
FIG. 1A shows the prior art torque curves of a three-phase spindle motor and the torque output when commutating the windings at a substantially fixed commutation interval.
Figure 1B:
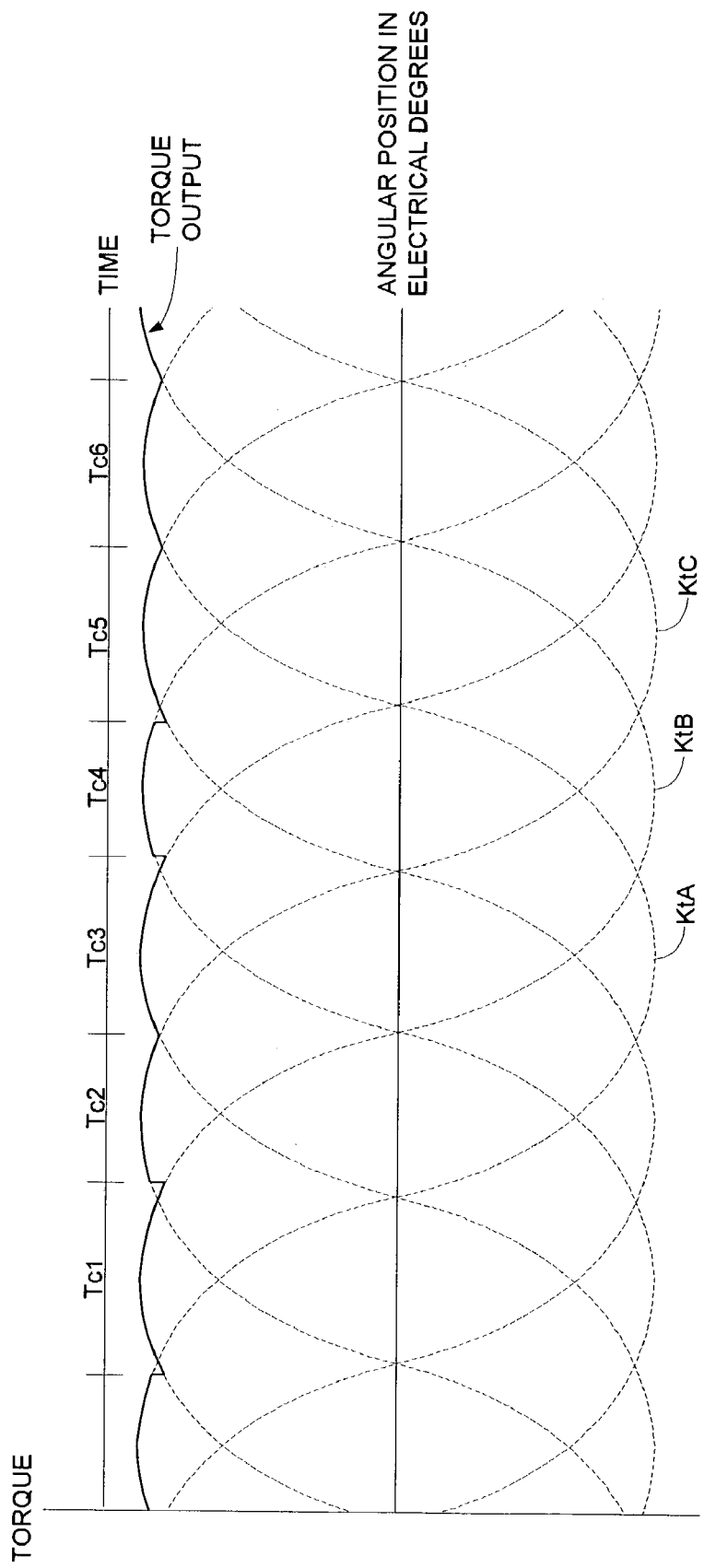
FIG. 1B illustrates a prior art technique for reducing the audible noise of the spindle motor by phase modulating the commutation interval which generates discontinuities in the torque output.
Figure 3:
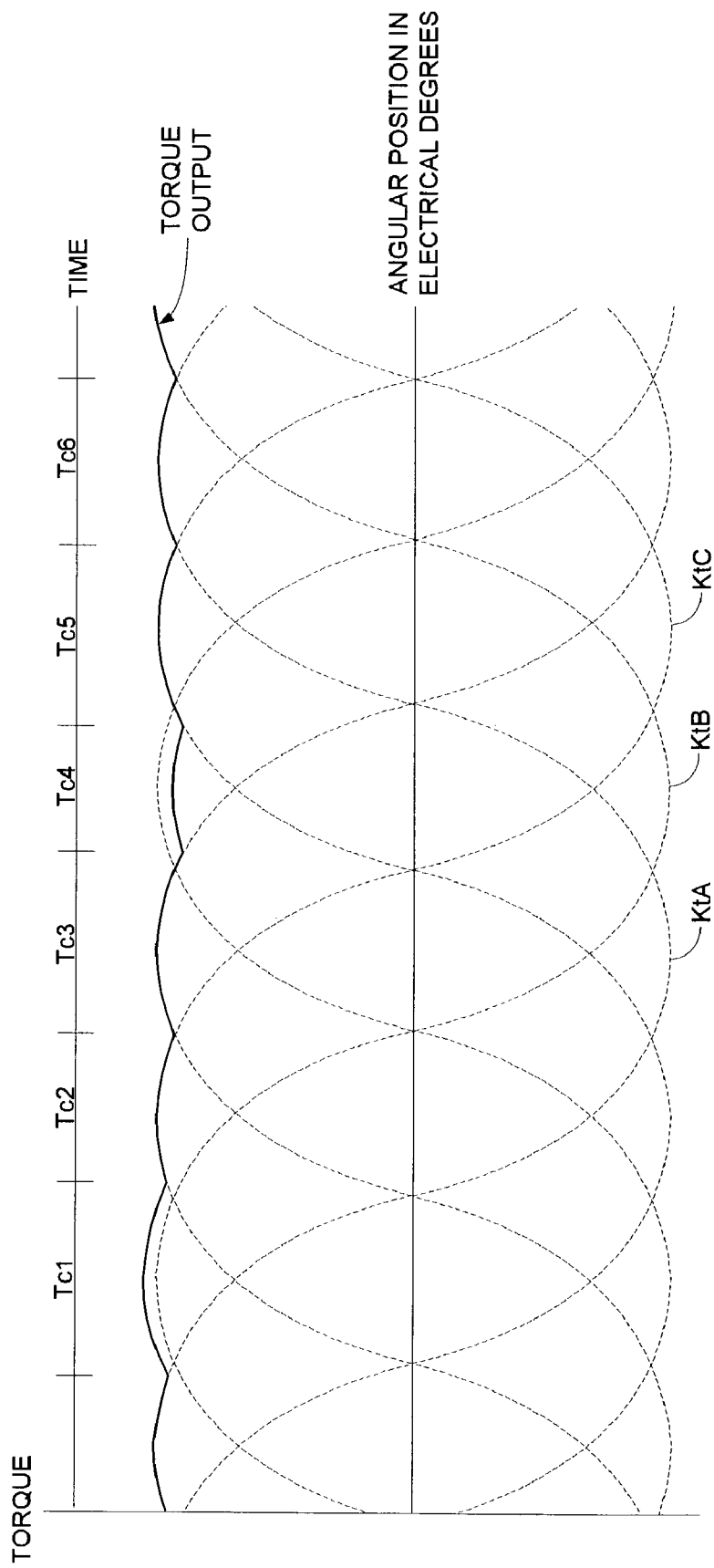
FIG. 3 shows torque curves illustrating the current modulation over the commutation intervals to reduce the discontinuities in the torque output caused by phase modulating the commutation intervals.

FIG. 3 illustrates the effect of modulating the current applied to the windings of the spindle motor 6 in order to reduce the discontinuities caused by phase modulating the commutation intervals. In the embodiment of FIG. 3, the phase modulator 12 extends commutation interval Tc1 and shortens commutation interval Tc4 in order to reduce undesirable vibrations, such as vibrations that cause undesirable audible noise. As illustrated in FIG. 1B, this causes discontinuities in the torque output when the commutation sequencer 10 changes the commutation state at the beginning and end of the commutation intervals Tc1 and Tc4. Increasing the current during commutation interval Tc1 and decreasing the current during commutation interval Tc4 adjusts the torque output curve so that the discontinuities caused by the phase modulator 12 are reduced. In effect, modulating the current applied to the windings of the spindle motor 6 modulates the torque output over the commutation intervals in order to reduce the discontinuities caused by phase modulating the commutation interval.

The phase modulator 12 shown in FIG. 2 may comprise any suitable circuitry. In one embodiment, a counter is loaded with different interval values to phase modulate the commutation intervals as disclosed in the above reference U.S. Pat. No. 6,493,169.

Figure 4:
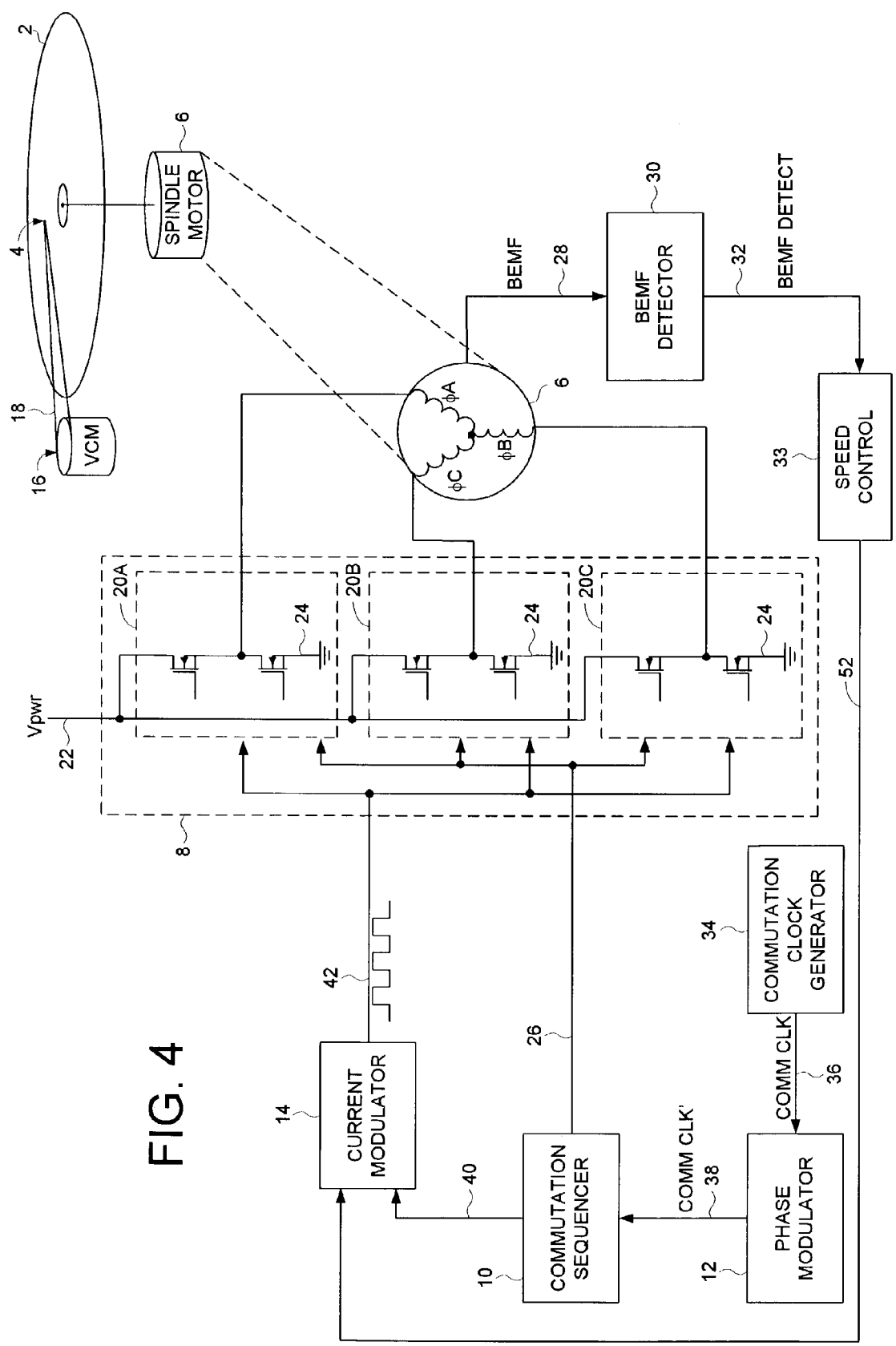
FIG. 4 shows a disk drive according to an embodiment of the present invention wherein the windings of the spindle motor are commutated by controlling a plurality of switches which are pulse width modulated (PWM) to control the amount of current applied to the windings of the spindle motor, wherein the current modulator modulates a duty cycle of the PWM signal.

FIG. 4 shows a disk drive according to a more detailed embodiment of the present invention. In this embodiment, the power driver 8 comprises three sets of commutation switches 20A–20C each comprising a first field effect transistor (FET) for connecting a respective winding to a power supply Vpwr 22 and a second FET for connecting the respective winding to ground 24. The commutation sequencer 10 generates a control signal 26 applied to the commutation switches 20A–20C in order to drive current from the power supply 22 through the appropriate windings to ground 24 as determined from the commutation state. The commutation sequencer 10 may control the commutation switches 20A–20C in any suitable manner, such as in a conventional bipolar commutation sequence, tripolar commutation sequence, or hybrid bipolar-tripolar commutation sequence as disclosed in the above referenced U.S. Pat. No. 5,808,440.

A commutation clock generator 34 generates a nominal commutation clock 36, and the phase modulator 12 modulates a phase of the nominal commutation clock 36 to generate a phase modulated commutation clock 38. The commutation sequencer 10 uses the phase modulated commutation clock 38 to generate the control signal 26 at the appropriate time to change the commutation state.

In the embodiment of FIG. 4, the amount of current applied to the windings and therefore the torque output of the spindle motor 6 is controlled using a pulse width modulated (PWM) signal 42. The PWM signal 42 periodically switches on and off the FETs of the active commutation switches 20A–20C (as selected by control signal 26). The amount of current applied to the windings during a commutation interval is controlled by varying a duty cycle of the PWM signal 42. The current modulator 14 modulates the current applied to the windings by modulating the duty cycle of the PWM signal 42 in response to a control signal 40 representing the commutation interval of the commutation sequencer 10.

In the embodiment of FIG. 4, during part of the commutation sequence at least one of the windings is left floating (both FETs of the respective commutation switch 20A–20C are turned off). The floating winding generates a BEMF voltage 28, and a BEMF detector 30 detects zero-crossings in the BEMF voltage 28 to generate a BEMF detect signal 32 with a frequency corresponding to the velocity of the spindle motor 6. The BEMF detect signal 32 is processed by a speed control circuit 33 which generates a speed correction current command 52 used by the current modulator 14 to adjust the duty cycle of the PWM signal 42.

The speed correction current command 52 can be updated over any suitable interval. In one embodiment, the speed correction current command 52 is updated once per physical revolution of the spindle motor 6. In another embodiment, the speed correction current command 52 is updated once per electrical cycle of the spindle motor 6. In yet another embodiment, the speed correction current command 52 is updated between every commutation interval within each electrical cycle of the spindle motor 6.

Figure 5:
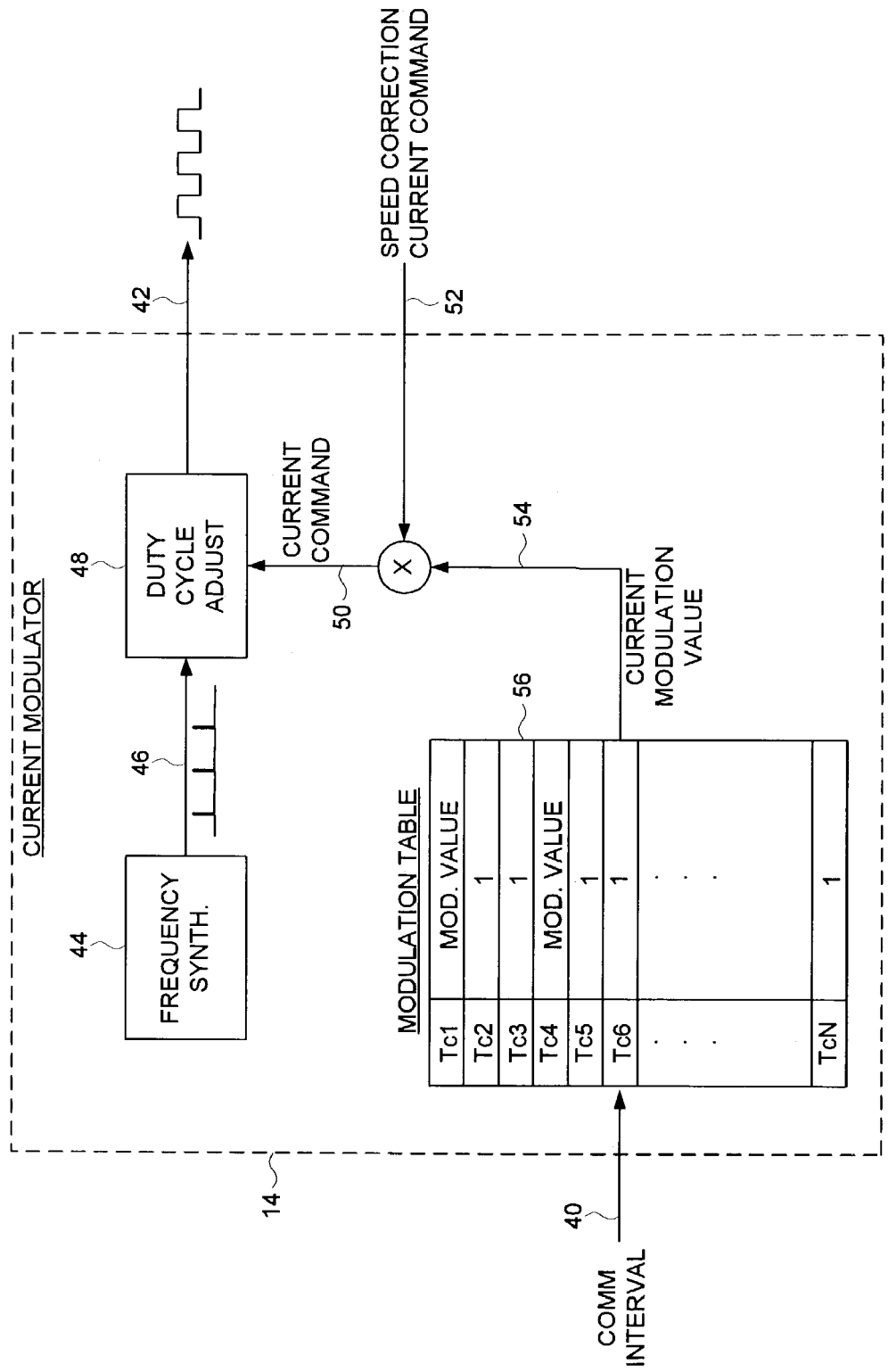
FIG. 5 shows an embodiment of the present invention wherein a duty cycle of the PWM signal of FIG. 4 is controlled by a current command comprising a speed correction current command and a current modulation value from a modulation table indexed by the commutation interval.

FIG. 5 shows details of the current modulator 14 of FIG. 4 according to an embodiment of the present invention. A frequency synthesizer 44 generates a pulse train 46 having a predetermined frequency. A duty cycle adjust circuit 48 outputs the PWM signal 42 which is a substantially rectangular wave with a selected duty cycle. The duty cycle adjust circuit 48 comprises any suitable circuitry, such as a counter loaded with a count value at each pulse of the pulse train 46. The duty cycle adjust circuit 48 adjusts the duty cycle of the PWM signal 42 in response to a current command 50 generated from a speed correction current command 52 and a current modulation value 54. The speed correction current command 52 is generated by the speed control circuit 33 (FIG. 4) by subtracting the actual speed of the spindle motor (represented by the BEMF detect signal 32) from a target speed. In this manner the speed correction current command 52 increases or decreases the torque output of the spindle motor 6 to maintain the desired angular velocity. A modulation table 56 stores a current modulation value corresponding to each commutation interval 40. In the embodiment of FIG. 5, the current modulation value 54 is multiplied by the speed correction current command 52 in order to modulate the duty cycle of the PWM signal 42 and thereby modulate the current applied to the windings of the spindle motor 6. However, any suitable mathematical technique may be employed to modulate the current, including addition, division, etc. In the embodiment of FIG. 5, the modulation table 56 stores a non-unity current modulation value for commutation intervals Tc1 and Tc4 and a unity current modulation value for commutation intervals Tc2, Tc3, Tc5, Tc6 and TcN so that the discontinuities in the torque output as shown in FIG. 1B are reduced as shown in FIG. 3.

Figure 6:
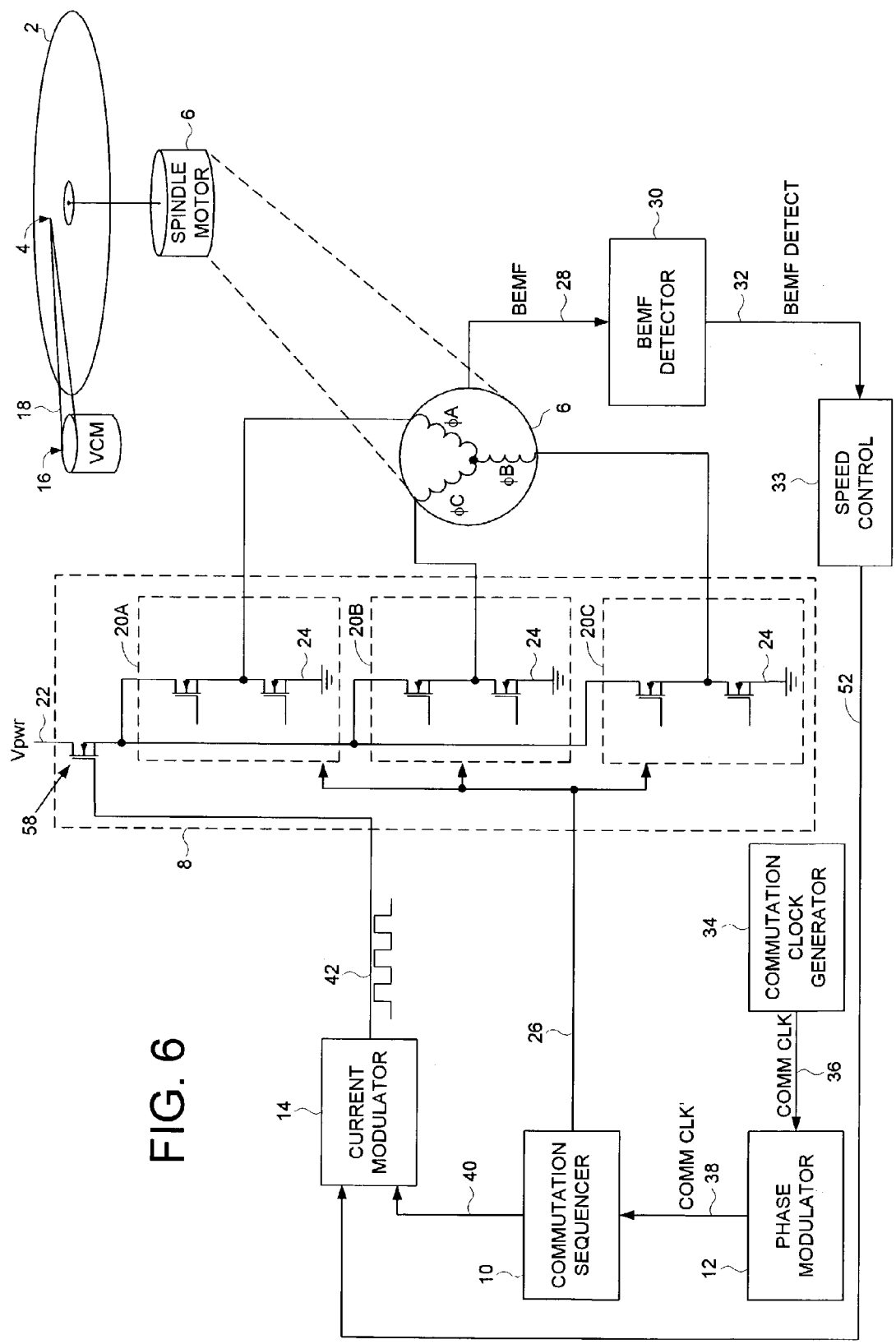
FIG. 6 shows an embodiment of the present invention wherein a separate switch is used to control the current applied to the windings of the spindle motor in response to the PWM signal.
Figure 7:
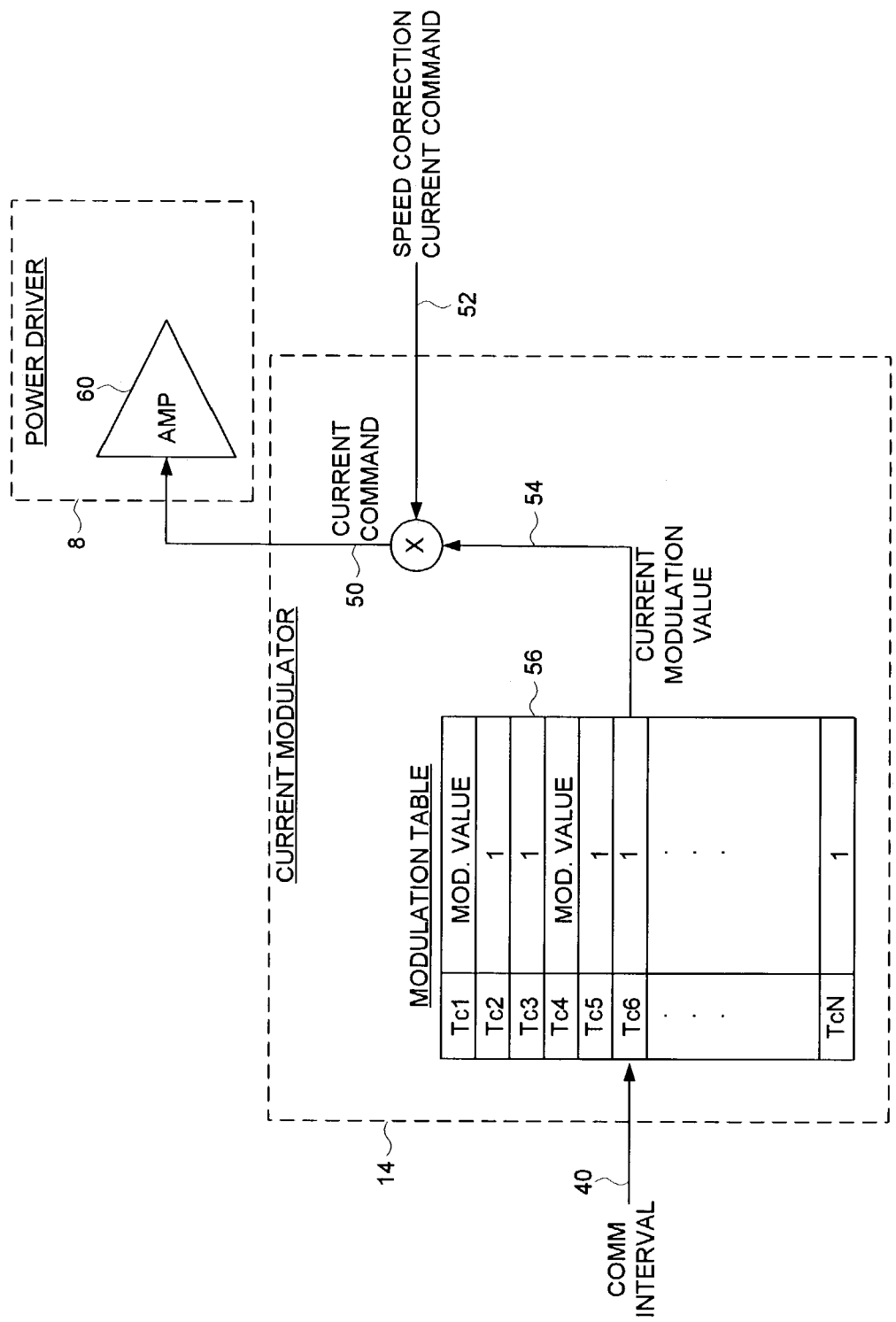
FIG. 7 shows an embodiment of the present invention wherein the power driver comprises a linear driver.
Figure 8:
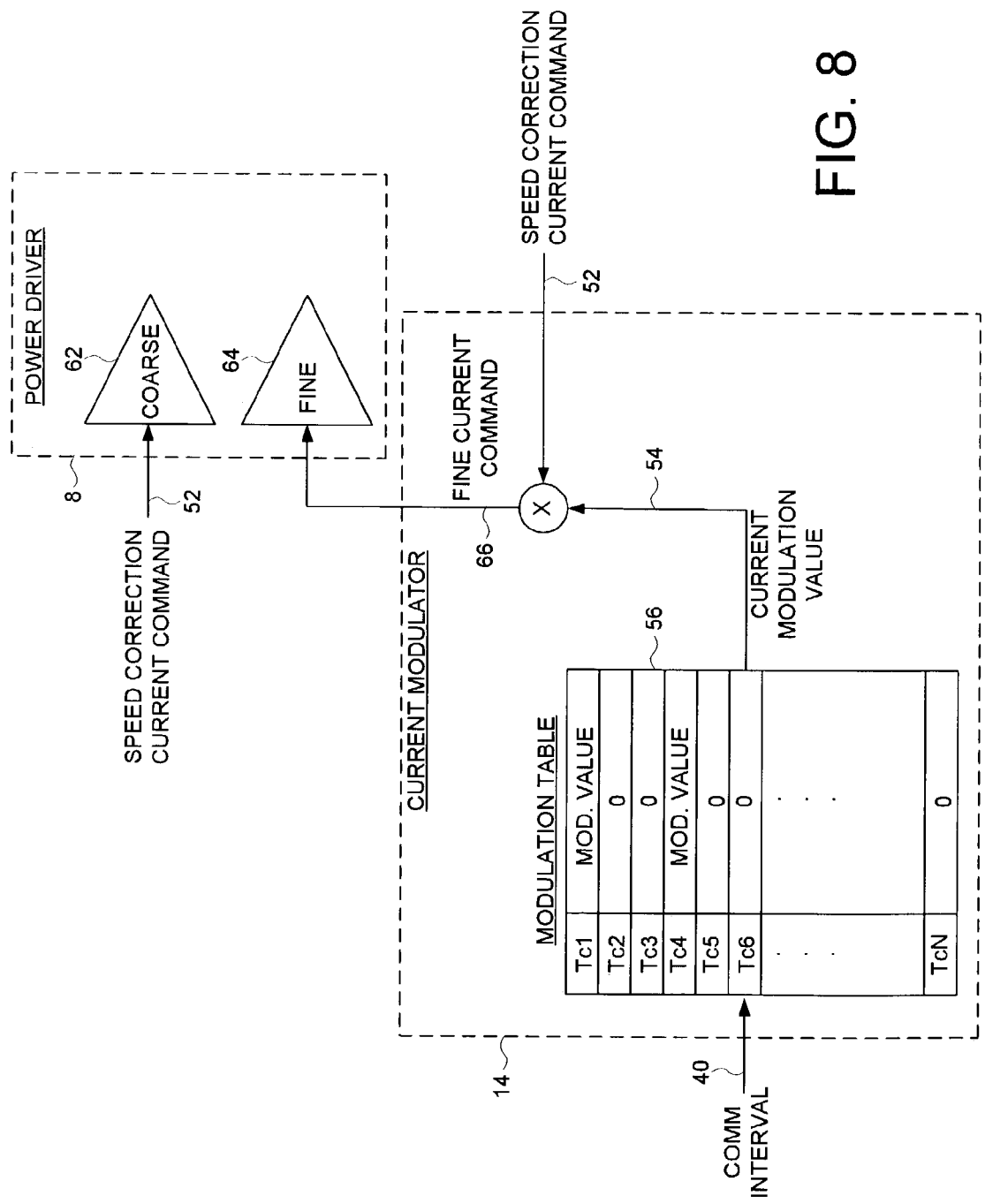
FIG. 8 shows an embodiment of the present invention wherein the power driver comprises a coarse driver and a fine driver.

In the embodiment of FIG. 5, the phase offset is the same for each of the modulated commutation intervals and therefore the corresponding current modulation value in each non-unity entry in the modulation table 56 are the same. In an alternative embodiment, the phase offset varies for each of the modulated commutation intervals and therefore each non-unity entry in the modulation table 56 stores a correspondingly different current modulation value. The current applied to the windings of the spindle motor 6 may be modulated using any suitable circuitry. FIG. 6 shows an embodiment wherein the power driver 8 comprises a separate FET 58 controlled by the PWM signal 42 to connect the supply voltage 22 to the active commutation switches 20A–20C. Alternatively, a separate FET may be employed to connect the active commutation switches 20A–20C to ground 24. FIG. 7 shows details of an alternative embodiment wherein the power driver 8 comprises a linear amplifier 60 implemented with any suitable circuitry. In this embodiment, the linear amplifier 60 comprises the FETs of the active commutation switches 20A–20C (FIG. 4) operating in a linear region (rather than in a PWM mode). The linear amplifier 60 is driven by the current command 50 generated from the speed correction current command 52 and the current modulation value 54. FIG. 8 shows yet another embodiment wherein the power driver 8 comprises a coarse driver 62 and fine driver 64 (PWM or linear) for generating the current applied to the windings of the spindle motor 6. The coarse driver 62 is responsive to the speed correction current command 52, and the fine driver 64 is responsive to a fine current command 66 generated from the current modulation value 54 multiplied by the speed correction current command 52.

The appropriate current modulation value for each commutation interval that minimizes the torque discontinuities may be determined in any suitable manner. In one embodiment, the torque profile for a plurality of disk drives is measured for different current values to establish a nominal torque profile from which the appropriate current modulation values are determined relative to the phase offsets. In another embodiment, the current modulation values are determined analytically from nominal torque constants in relation to the phase offsets. In yet another embodiment, the current modulation values are modified until the audible noise generated by the disk drive is minimized as detected using any suitable sound transducer. In one embodiment, nominal current modulation values which minimize the audible noise over a number of disk drives are established and then used for a family of disk drives, and in an alternative embodiment, optimal current modulation values may be established and updated individually for each disk drive while in-the-field.

The circuitry implementing the commutation sequencer 10, phase modulator 12, and current modulator 14 shown in FIG. 2 may be implemented in any suitable circuitry, such as a disk controller or the power driver 8. In one embodiment, the circuitry may be distributed over multiple integrated circuits, for example, the commutation sequencer 10 implemented within a disk controller and the phase modulator 12 and current modulator 14 implemented within the power driver 8. In an alternative embodiment, the circuitry of FIG. 2 may be integrated within a single integrated circuit or "system on a chip" comprising both the disk controller and the power driver 8.

We claim:
1. A disk drive comprising:
 (a) a disk;
 (b) a head actuated over the disk;
 (c) a spindle motor for generating a torque output to rotate the disk, the spindle motor comprising a plurality of windings;
 (d) a power driver comprising a plurality of commutation switches for selectively energizing the windings;
 (e) a commutation sequencer for controlling the commutation switches to configure the windings into a plurality of commutation states over a plurality of commutation intervals;
 (f) a phase modulator for phase modulating the commutation intervals; and
 (g) a current modulator for controlling a current applied to the windings in each of the commutation states to substantially reduce discontinuities in the torque output of the spindle motor caused by the phase modulator.

2. The disk drive as recited in claim 1, wherein the phase modulator and the current modulator reduce internal vibrations.

3. The disk drive as recited in claim 2, wherein the phase modulator and the current modulator reduce internal vibrations that cause audible noise.

4. The disk drive as recited in claim 1, wherein the current modulator modulates the torque output over the commutation intervals to reduce the discontinuities in the torque output of the spindle motor.

5. The disk drive as recited in claim 1, further comprising a commutation clock generator for generating a nominal commutation clock, wherein:
the phase modulator modulates a phase of the nominal commutation clock to generate a phase modulated commutation clock;
the commutation sequencer uses the phase modulated commutation clock to change the commutation state;
phase modulating the commutation clock spreads commutation energy over a frequency spectrum to reduce audible noise generated by the spindle motor;
phase modulating the commutation clock generates torque discontinuities when the commutation sequencer changes the commutation state; and
the current modulator reduces the torque discontinuities caused by phase modulating the commutation clock.

6. The disk drive as recited in claim 1, wherein:
the current modulator generates a pulse width modulated (PWM) signal; and
a duty cycle of the PWM signal is adjusted in response to a current command comprising:
a speed correction current command; and
a current modulation value corresponding to the commutation interval.

7. A method of operating a disk drive, the disk drive comprising, a disk, a head actuated over the disk, and a spindle motor for generating a torque output to rotate the disk, the spindle motor comprising a plurality of windings, the method comprising the steps of:
(a) selectively energizing the windings based on a plurality of commutation states over a plurality of commutation intervals;
(b) modulating a phase of the commutation intervals; and
(c) modulating a current applied to the windings in each of the commutation states to substantially reduce discontinuities in the torque output of the spindle motor caused by modulating the phase of the commutation intervals.

8. The method as recited in claim 7, wherein the steps of modulating the phase of the commutation intervals and modulating the current applied to the windings reduces internal vibrations.

9. The method as recited in claim 8, wherein the steps of modulating the phase of the commutation intervals and modulating the current applied to the windings reduces internal vibrations that cause audible noise.

10. The method as recited in claim 7, wherein the step of modulating the current applied to the windings modulates the torque output over the commutation intervals to reduce the discontinuities in the torque output of the spindle motor.

11. The method as recited in claim 7, wherein the step of modulating the phase of the commutation intervals comprises the steps of:
generating a nominal commutation clock;
modulating a phase of the nominal commutation clock to generate a phase modulated commutation clock; and
changing the commutation state in response to the phase modulated commutation clock,
wherein:
modulating the phase of the commutation clock spreads commutation energy over a frequency spectrum to reduce audible noise generated by the spindle motor;
modulating the phase of the commutation clock generates torque discontinuities when the commutation state changes; and
modulating the current applied to the windings reduces the torque discontinuities caused by phase modulating the commutation clock.

12. The method as recited in claim 7, wherein the step of modulating the current applied to the windings comprises the steps of:
generating a pulse width modulated (PWM) signal; and
adjusting a duty cycle of the PWM signal in response to a current command comprising:
a speed correction current command; and
a current modulation value corresponding to the commutation interval.

* * * * *